United States Patent
Ashwood Smith et al.

(10) Patent No.: US 8,330,601 B2
(45) Date of Patent: Dec. 11, 2012

(54) THREE DIMENSIONAL RF SIGNATURES

(75) Inventors: Peter Ashwood Smith, Hull (CA); Delfin Y. Montuno, Kanata (CA); Abel Dasylva, Kanata (CA)

(73) Assignee: Apple, Inc., Cupertino, CA (US)

( * ) Notice: Subject to any disclaimer, the term of this patent is extended or adjusted under 35 U.S.C. 154(b) by 1006 days.

(21) Appl. No.: 11/525,298

(22) Filed: Sep. 22, 2006

(65) Prior Publication Data

US 2008/0074270 A1 Mar. 27, 2008

(51) Int. Cl.
*G08B 13/14* (2006.01)
(52) U.S. Cl. .................. 340/572.1; 340/10.4
(58) Field of Classification Search .................. None
See application file for complete search history.

(56) References Cited

U.S. PATENT DOCUMENTS

| | | | | |
|---|---|---|---|---|
| 6,204,765 B1 * | 3/2001 | Brady et al. | ............. | 340/572.1 |
| 6,380,438 B1 * | 4/2002 | Winter | ............. | 568/464 |
| 6,380,732 B1 * | 4/2002 | Gilboa | ............. | 324/207.17 |
| 6,396,438 B1 * | 5/2002 | Seal | ............. | 342/127 |
| 6,661,335 B1 * | 12/2003 | Seal | ............. | 340/10.1 |
| 6,917,290 B2 * | 7/2005 | Land | ............. | 340/539.1 |
| 7,268,684 B2 * | 9/2007 | Tethrake et al. | ............. | 340/572.1 |
| 7,545,254 B2 * | 6/2009 | Brillon | ............. | 340/5.61 |
| 2002/0033752 A1 * | 3/2002 | Greenwood et al. | ............. | 340/5.61 |
| 2004/0178955 A1 * | 9/2004 | Menache et al. | ............. | 342/463 |
| 2005/0073418 A1 * | 4/2005 | Kelliher et al. | ............. | 340/572.1 |
| 2006/0012481 A1 * | 1/2006 | Rajapakse et al. | ............. | 340/572.1 |
| 2006/0273905 A1 * | 12/2006 | Choi et al. | ............. | 340/572.1 |
| 2007/0247286 A1 * | 10/2007 | Drago et al. | ............. | 340/10.4 |

\* cited by examiner

*Primary Examiner* — Jennifer Mehmood
*Assistant Examiner* — Brian Wilson
(74) *Attorney, Agent, or Firm* — Meyertons, Hood, Kivlin, Kowert & Goetzel, P.C.; Eric B. Meyertons

(57) ABSTRACT

Three dimensional RF tag signatures may be obtained from a three dimensional RF tag or multiple two or three dimensional RF tags so that information in addition to presence information may be obtained. In one embodiment, a three dimensional RF tag having two or more power coils disposed in non-coplanar planes enables the coils to experience different levels of excitation from an electromagnetic field. This information may be transmitted along with the RF tag response to enable the orientation of the RF tag relative to an RF tag reader to be determined. In another embodiment, multiple RF tags (either standard RF tags or three dimensional RF tags) may be used on a given article and a response signature from the article as a whole may be recorded. The three dimensional response signature thus collected may be compared with previous versions of the response signature to determine if the article has been altered.

11 Claims, 4 Drawing Sheets

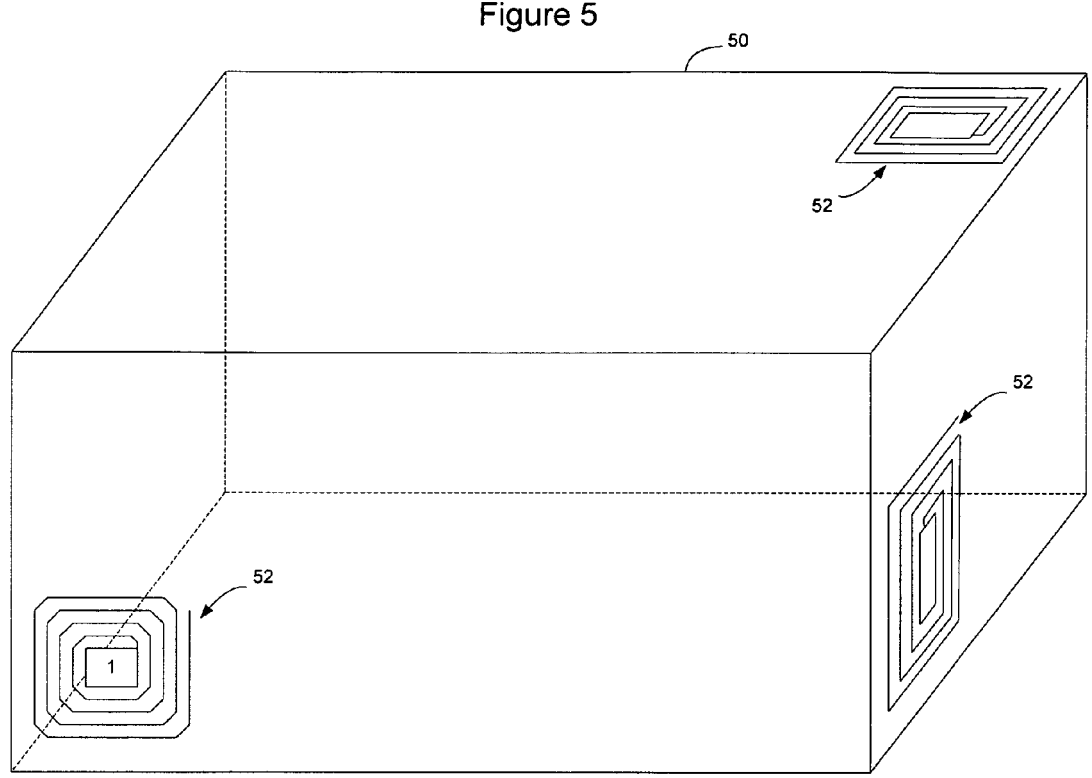
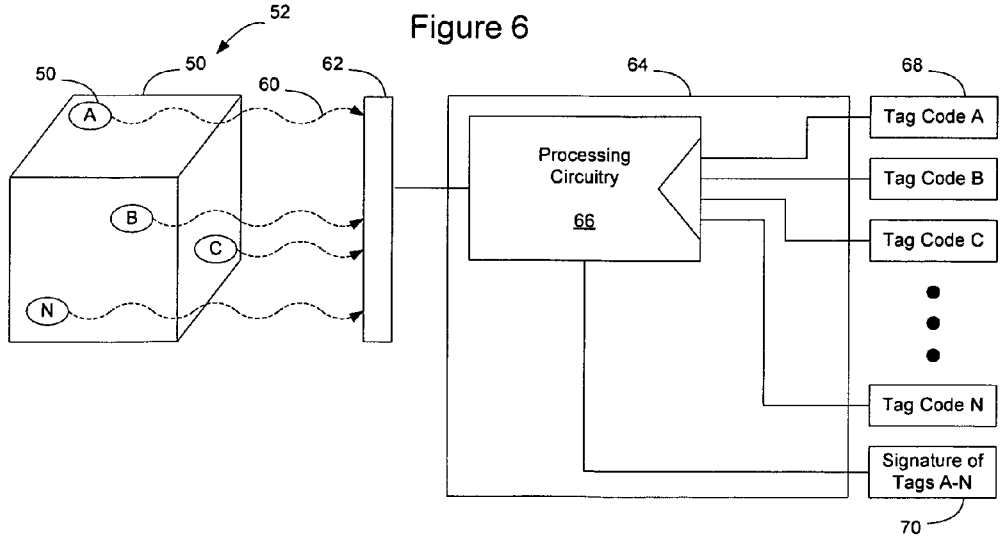

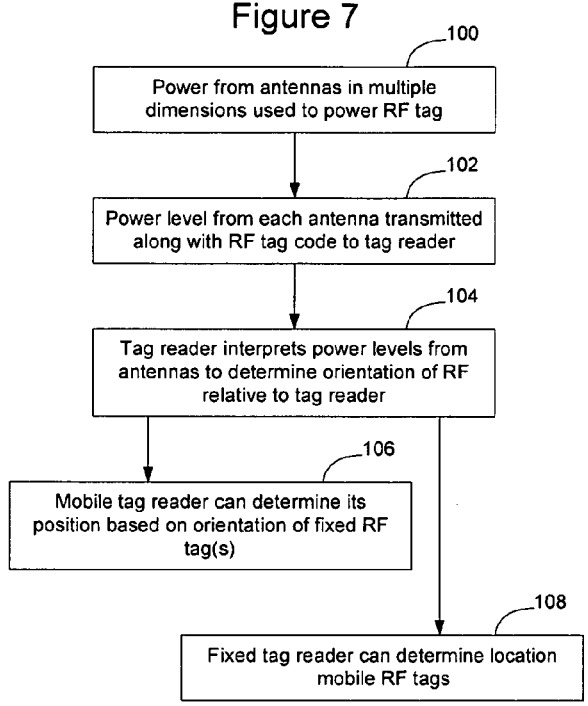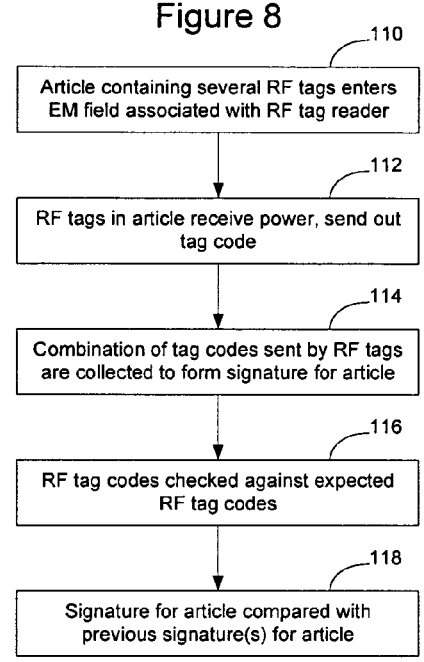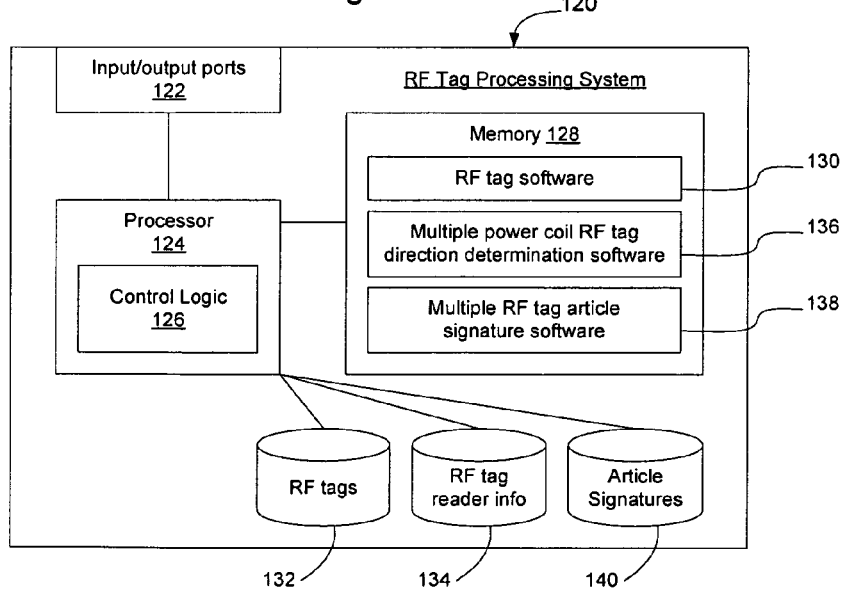

THREE DIMENSIONAL RF SIGNATURES

BACKGROUND OF THE INVENTION

1. Field of the Invention

The present invention relates to Radio Frequency (RF) tags and, more particularly, to three dimensional RF tag signatures.

2. Description of the Related Art

Radio Frequency tags, also known as Radio Frequency Identification (RFID) tags use electromagnetic radiation to temporarily charge a circuit, which may be programmed to wirelessly transmit a data code. If the data transmitted by the circuit is received by an RF tag reader, it is possible to determine that the RF tag is in the proximity of the RF tag reader. By causing different chips to transmit different RF tag codes, the identity of the RF tag may be determined, which will allow a RF tag processing system interfaced with the RF tag reader to uniquely place that RF tag in a particular place at a particular point in time. Thus, by associating the RF tags with individual articles that are to be tracked, it is possible to keep track of many different articles electronically. RF tags may be used in many applications, and the number of applications of RF tags has been increasing dramatically in the last few years. For example, RF tags are used in retail establishments to keep track of merchandise, in manufacturing to keep track of inventory, in corporations for example in building access badges, and in many other fields.

FIG. 1 shows an example RF tag. As shown in FIG. 1, a standard RF tag 10 includes a coil 12 that will be used to capture electromagnetic radiation to produce a current. As is well known, changing an electromagnetic field relative to a coil will cause an electrical current to flow in the coil. Thus, by modulating an electromagnetic field it is possible to cause a current to be generated in the coil of an RF tag. Where the coil 12 is connected to an electromagnetic circuit 14, and the electrical current is used to power to circuit 14. The circuit may be used for many different things, but generally is configured to transmit a tag response including a tag code that may be read by a RF tag reader 20 (see FIG. 2). RF tags are well known, and many different types and sizes/shapes of RF tags and circuits have been developed.

As shown in FIG. 2, in operation a RF tag reader 20 generates a strong electromagnetic field 22 which will cause a current to be generated in any RF tags within a given distance of the RF tag reader. When an RF tag 10 comes into proximity of the RF tag reader 20, the RF tag will generate the tag response 24 which may be sensed by the reader 20 if the tag is sufficiently close to the reader 20.

RF tags provide an indication of presence of the tag relative to the reader, but generally do not provide an indication of where the RF tag is located within the reader's field of view. While it is possible to use an RF tag reader that has one or more directional antennas to help determine the relative position of the RF tag, doing so reduces the ability of the RF tag reader to detect the presence of RF tags outside of the directional antenna beam.

Similarly, when an RF tag is associated with an article, for example where RF tags are to be used to track boxes of merchandise or luggage, sensing the presence of an RF tag will enable the reader to determine the rough location of a particular article at that particular point in time. The RF reader is not able however, to determine the state of the article or whether the article has been damaged or altered since the last time the RF tag presence was sensed. Accordingly, while RF tags are very useful for tracking where articles are at particular points in time, it would be advantageous to provide a way in which the RF tags could provide additional information about the articles being tracked.

SUMMARY

Three dimensional RF tag signatures may be obtained from a three dimensional RF tag or multiple two or three dimensional RF tags so that information in addition to presence information may be obtained. In one embodiment, a three dimensional RF tag having two or more power coils disposed in non-coplanar planes, enables the coils to experience different levels of excitation from an electromagnetic field associated with the RF tag reader. This information may be transmitted along with the RF tag response to enable the orientation of the RF tag relative to the RF tag reader to be determined. In another embodiment, multiple RF tags (either standard RF tags or three dimensional RF tags) may be used on a given article and a response signature from the article as a whole may be recorded. The three dimensional response signature thus collected may be compared with previous versions of the response signature to determine if the article has been altered.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 5 is a diagram of an article having a plurality of RF tags;

FIG. 6 is a functional block diagram of an RF tag reader obtaining a three dimensional signature from an article such as the article of FIG. 5;

FIG. 7 is a flow chart illustrating a process of determining a relative orientation of an RF tag from a signature of a three dimensional RF tag, such as the RF tag of FIGS. 3-4, according to an embodiment of the invention;

FIG. 8 is a flow chart illustrating a process of comparing a three dimensional RF tag signature from an article having a plurality of RF tags, such as the article shown in FIGS. 5-6, with a previous signature for the same article according to an embodiment of the invention; and FIG. 9 is a functional block diagram of a computer system configured to implement an RF tag processing system according to an embodiment of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 3:
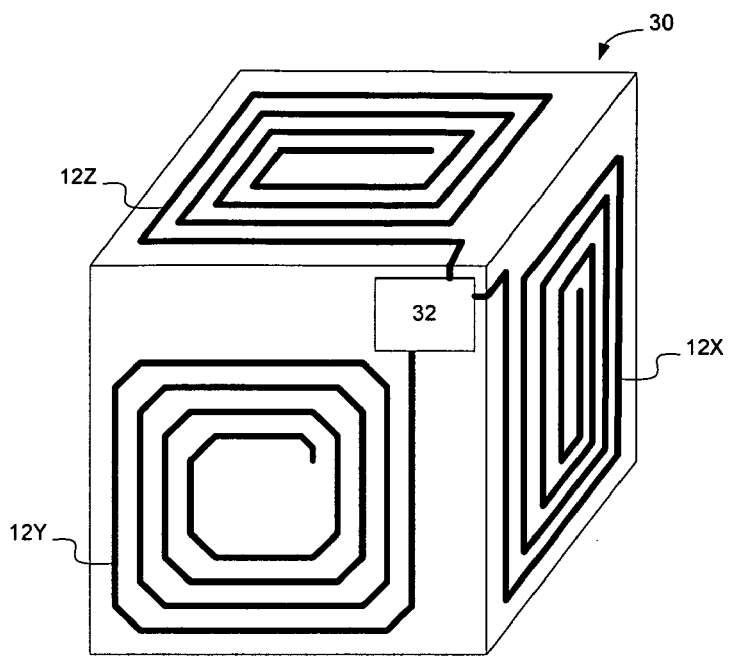
FIG. 3 is a functional block diagram of an RF tag having three non-coplanar power coils according to an embodiment of the invention.

FIG. 3 illustrates an example of a RF tag having more than one power coil, in which the power coils are not formed to be co-planar. By using non-co-planar power coils, the several power coils will generate different amounts of power when subjected to a directional electromagnetic field. The chip may transmit a power coil value indicative of the amount of power, current, voltage, or another measurable quantity, that it received from each power coil in connection with generating its tag response. These power coil values may be used by the RF tag reader or RF tag processing system to deduce an orientation of the RF tag relative to the RF tag reader.

In the embodiment shown in FIG. 3, the three dimensional RF tag 30 includes three power coils 12X, 12Y, and 12Z. The three power coils are connected to the circuit 32 and provide power to the circuit. Although the embodiment shown in FIG. 3 has three power coils, the invention is not limited in this manner as two power coils or a larger number of power coils may be used as well. Additionally, although the embodiment shown in FIG. 3 has the power coils disposed on orthogonal planes, this is merely a preferred embodiment. The invention is not limited to this particular embodiment as other types of three dimensional RF tags having more than one power coil disposed in a non-planar fashion may have the power coils disposed on differently oriented planes.

Figure 4:
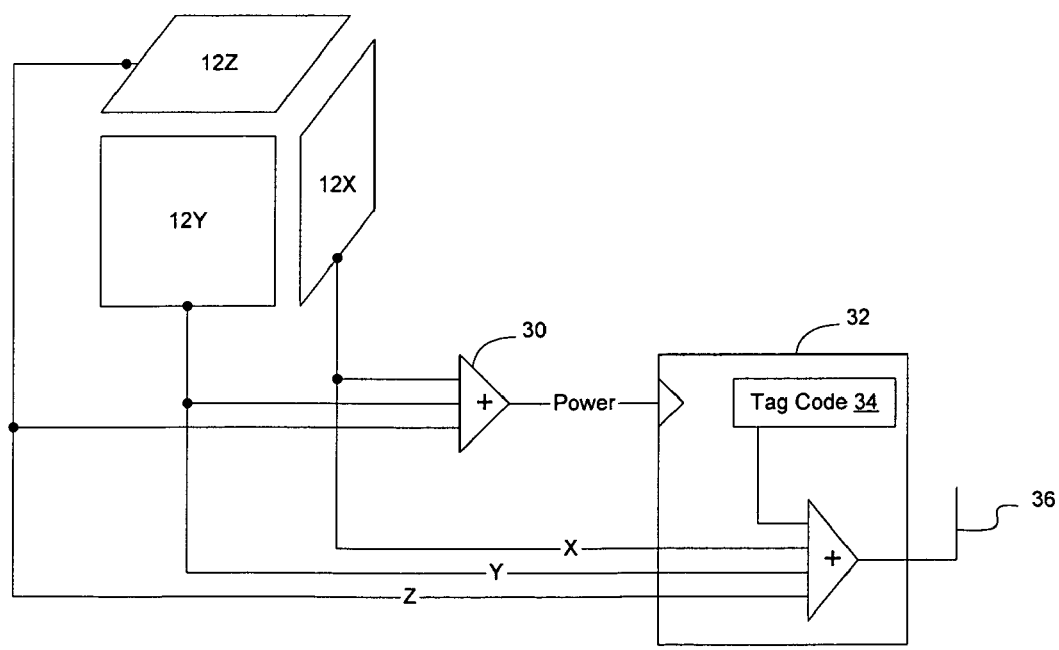
FIG. 4 is a diagram showing the electrical interconnection of the power coils an circuit of the RF tag of FIG. 3 in greater detail.

FIG. 4 provides additional details about how the power received from the several power coils is used by the circuit 32. As shown in FIG. 4, the power received from each of the power coils 12X, 12Y, and 12Z is added together to form an input power to the circuit 32. Additionally, the electrical signals from the power coils 12X, 12Y, and 12Z are each measured by the RF tag. The RF tag may measure the power from the power coils, the amount of current being generated, the voltage, or another electrical characteristic derivable from measuring the output of the power coils.

Once the RF tag has taken measurements of the power coils, it will transmit the tag code 34 along with power coil values to the RF tag reader via an antenna 36. The power coil values are indications of the electrical characteristics of the several power coils and may be actual readings of the characteristic that is being measured, or one or more values derived from the measured characteristic. The tag code may be a standard tag code, and the rest of the circuit that is configured to actually transmit the data may be the same as a standard RF tag, except that instead of transmitting only a tag code the RF tag will also transmit the power coil values as well.

The amount of current generated in a given coil depends not only on the strength of the electromagnetic field, but also on the orientation of the coil relative to the field. If a RF tag reader is transmitting electromagnetic (EM) radiation, the direction of the radiation over the area occupied by the three dimensional RF tag may be considered to be relatively constant in one direction, given the size of a typical RF tag relative to the distance to the RF tag reader. By placing the power coils in different planes such as the orthogonal planes shown in FIGS. 3 and 4, the power coils will therefore be oriented at different angles relative to the EM radiation source. Thus, different currents should be produced in each of the power coils of the RF tag. If the tag has a known geometry, such as if the tag is formed to have three power coils on three mutually orthogonal planes as shown in FIGS. 3 and 4, the orientation of the tag relative to the reader may be determined.

The amount of current generated in a given coil may be expected to be dependent on the strength of the EM field at the RF tag. If a point EM source radiating in all directions is used to generate the EM field, then the strength of the radiation should be expected to drop off on the order of $d^3$, where d is the distance from the point source to the RF tag. By measuring the magnitude of the electrical response in these power coils, a rough estimate of the distance between the RF tag and the tag reader may be obtained.

The distance and/or orientation information obtainable from an RF tag having multiple non-co-planar power coils may be used in many different applications. For example, in manufacturing, a stationary RF reader may use RF tags to identify when particular parts are approaching a manufacturing station. Knowing the orientation of the RF tag may enable the RF tag reader to determine if the part has been incorrectly placed on the conveyance system, may help the RF tag reader to know where the part is within its field of view, and may help in other ways. For example, knowing the orientation of a tag may enable the system to know if the article associated with the tag is up-side-down.

Similarly, where the location of the RF tag has been fixed and the RF tag reader is mobile, knowing the direction from the reader to the RF tag, and optionally the distance between the reader and the RF tag, may help the RF tag reader stay on a desired side of the fixed RF tags. This may be useful, for example in connection with self-propelled vehicles and in other applications. For example, if the RF tags are embedded in a roadway, the three dimensional signatures may enable an RF tag reader in an automobile to know whether it is traveling on the left side or right side of the RF tags.

The several example applications described herein are not intended to limit application of the invention to one or two fields, but rather have been provided to show some practical utility for the invention. The invention is thus not limited to the use of the inventive three dimensional RF tag signatures in these several applications, since the signatures may be used in many different ways that are too numerous to list herein.

Figure 1:
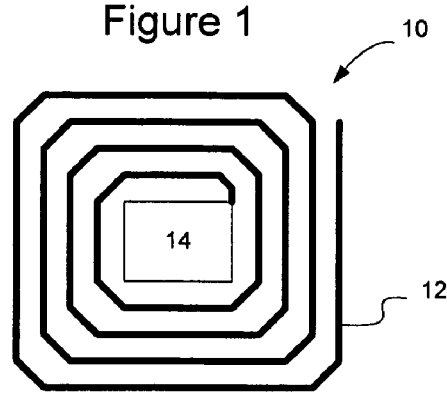
FIG. 1 is a functional block diagram an RF tag.

Although an embodiment has been described in which multiple antennas are connected to a given circuit, according to another embodiment of the invention, multiple RF tags 10 associated with an article may be used to generate a three dimensional signature for the article. These RF tags may be conventional tags such as the tag shown in FIG. 1, may be tags such as the RF tags discussed above in connection with FIGS. 3 and 4, or may be differently configured RF tags. FIG. 5 shows one example of this where three RF tags 52 are placed at different locations on an article 50. Since the RF tags will provide a spatial signature for the article that is dependent on their position on the article, changing the position of one or more of the RF tags will cause the three dimensional signature for the article to change. Detecting a change in the RF signature may thus enable a system to determine that the article has been altered between readings. This may be useful, for example, where security is an issue and it is important to detect whether tampering has occurred. Similarly, although an embodiment will be described in which the RF tags have been applied to an article, the invention is not limited in this manner as the RF tags may also be applied to a set of articles that are required to be kept together.

The signature will be unique to the article and depend on the orientation of the RF tags, the placement of the RF tags, and possibly the configuration of the article as well. For example, the RF tags may be distributed to form a spatial signature for the article. The RF tags may also be set to respond at different times so that the set of RF tags is able to form a temporal signature. Similarly, the response of one or more of the RF tags may be encoded, so that the signature is encoded. Thus, the three dimensional signature may include spatial signatures, time signatures, coding signatures, and combinations of these types of signatures.

Once an initial three dimensional RF signature is received for a given article, the signature may be stored for use at a later time. When a new signature is received for the article, the new signature may be compared with the stored signature to determine if the two signatures are sufficiently alike. If the signatures are sufficiently similar, it may be inferred that the RF tags or the relative placement of the RF tags has not been disturbed. If the signatures are sufficiently dissimilar, it is possible that the article has been tampered with, and an appropriate notification may be provided.

The three dimensional signature provided by a set of RF tags disposed within a given volume may be used in many different applications. For example, a signature may be obtained from a box of items. If the signature changes, it may be that the box has been opened. Similarly from a security standpoint, if one or more RF tags are associated with a piece of luggage, detecting a change in the luggage signature may indicate that the luggage has been opened, which may indicate that something has been stolen or added to the piece of luggage. In either instance, further inspection of the luggage may be warranted. The three dimensional signatures may be used in other applications as well and the invention is not limited to these several mentioned applications.

FIG. 6 shows an embodiment of a reader that may be configured to obtain RF signatures from a set of RF tags disposed within a volume. As shown in FIG. 6, responses 60 from tags 10 may be gathered by an antenna 62 and passed to an RF tag reader 64. The antenna may be integrated into the RF tag reader 64 and the invention isn't limited by the manner in which the response from the individual RF tags are collected by the RF tag reader 64.

The response from the RF tags 52 will be input to processing circuitry 66 where the tag codes 68 for the various RF tags will be extracted. In addition, the particular manner in which the RF tags responded may be stored as an RF signature 70 for the article. The tag codes and/or signature may be transmitted to a central area for further processing and/or storage. The invention is not limited by the particular manner in which these values are used once they have been obtained. However, as described above, multiple signatures from the same article 50 may be compared over time to determine if the article has been changed in a way that would change the RF signature of the article.

Figure 2:
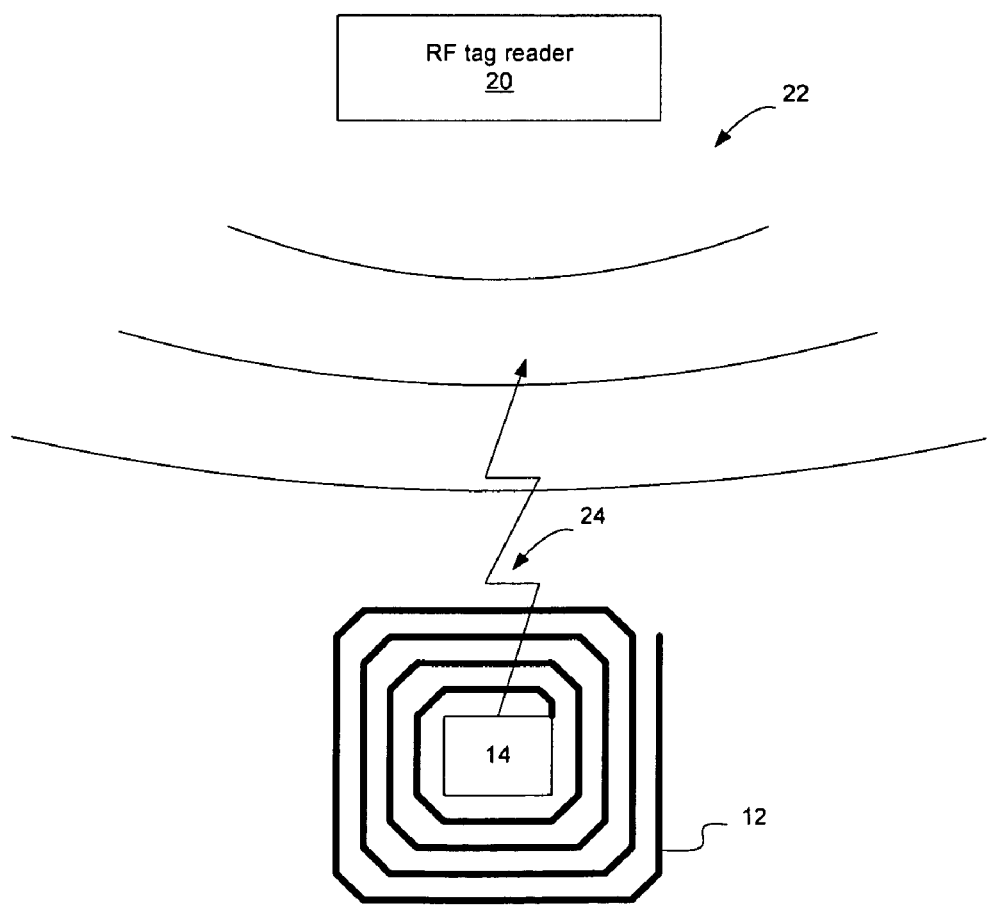
FIG. 2 is a functional block diagram of the interaction between an RF tag reader and an RF tag.

The RF tags 52 may be standard RF tags 12 described above in connection with FIGS. 1-2, or may be RF tags 30 that are configured to also provide an indication of the electrical characteristics of at least one of their power coil(s). For example, each RF tag may be configured to transmit not only its tag code, but also an indication of at least one electrical characteristic associated with its power coil. This may be implemented as discussed above in connection with FIGS. 3-4. The relative power levels of the several RF tags when interrogated from a particular angle and/or distance may provide information as to whether any of the RF tags have been moved relative to the location of the RF tag reader, and thus provide a way for tampering to be detected from an RF tag signature associated with a given set of RF tags.

FIGS. 7 and 8 show two processes that may be used to implement embodiments of the invention. As shown in FIG. 7, power from antennas in multiple dimensions may be used to power an RF tag (100). The power level (or other electrical characteristic) from each antenna may then be transmitted along with the RF tag code to a tag reader (102). The tag reader or an associated RF tag processing system will interpret the power levels from the antennas to determine an orientation of the RF tag relative to the RF tag reader (104). Alternatively, the tag reader may pass this information back to a central RF tag processing system that may then interpret the power levels of the antennas to determine the orientation of the RF tag relative to the RF tag reader. The particular location where this process happens will depend on how the invention is implemented and the invention is not to be limited in this manner to any particular implementation.

Where the tag reader is mobile, the mobile tag reader may be able to determine its position based on the orientation information obtained from a fixed RF tag (106). Similarly, where the tag reader is fixed, the location of the RF tag may be determined by analyzing the power levels recorded by the RF tag (108). The relative location information may then be used in many different ways depending on the particular application being implemented.

In the process shown in FIG. 8, when an article containing multiple RF tags enters an EM field associated with a tag reader (110), the RF tags in the article are powered by the EM field and emit a tag code, optionally in conjunction with information about the electrical characteristics of their one or more power coils (112). The combination of tag codes, the order in which the RF tags respond, the encrypted/unencrypted nature of the tag codes, and the other characteristics associated with the transmissions from the RF tags on the article are used to form a signature for the article as a whole (114). The RF tag codes may then be compared with expected RF tag codes to identify the article and to determine whether all of the expected RF tags have responded (116). The signature may also be checked against a previous signature for the article to determine if the signature has changed significantly (118). The signatures for the article may be used in many different ways as well, depending on the particular application being implemented FIG. 9 shows a functional block diagram of a RF tag processing system embodied as a computer system 120 that may be used to enable three dimensional RF signatures to be used to understand information about articles associated with the RF tag(s). In the embodiment shown in FIG. 9, the computer system 120 includes one or more input/output ports 122 to enable RF tag information to be received from one or more RF tag readers. The input/output ports may be standard network ports configured to enable the RF tag readers and the RF tag processing system to be interconnected by a communication network. Alternatively the input/output ports may be serial ports or other types of ports, for example where the RF tag reader(s) are directly connected to the computer system. Although the embodiment shows the computer system as separate from the RF tag readers, alternatively the processing functions described in connection with FIG. 9 may be performed by processing circuitry integrated with one or more of the RF tag readers. Thus, part of the functionality described as being attributable to the RF tag processing system may be distributed and instantiated in the RF tag reader or another component associated with the RF tag processing system. Similarly, some of the processing may be implemented on the RF tags themselves, particularly in connection with the three dimensional RF tags, and the invention is not limited to an embodiment in which all of the processing is done in the precise manner described herein.

The computer system includes a processor 124 containing control logic 126 configured to enable the processor to perform the functions associated with the RF tag processing system described herein. Specifically, the control logic may be connected to a memory 128 containing software and/or data that will enable the computer system to process RF tag responses, individually and collectively, to enable three dimensional information to be extracted from the RF tag responses.

In the embodiment shown in FIG. 9, the memory 128 includes RF tag software 130 enabling the RF processing system to maintain a correlation between RF tags and the articles with which they are associated. Many commercial systems have been developed to track articles using RF tags, and the RF tag software 128 in FIG. 9 may be configured to implement article tracking features in a manner similar to one or more of these commonly available systems. For example, the RF tag software may access a database of RF tags 132 and associated articles so that the system may provide information associated with particular articles to an operator of the RF processing system. Similarly, the RF tag software may have access to a database of RF tag readers 134 to determine the physical location of the readers that are providing RF tag information to the RF tag processing system.

The RF tag processing system shown in FIG. 9 also includes multiple power coil RF tag direction determination software 136. The software 136 may be a software module that is incorporated into the RF tag software 130 or may be a stand-alone software program. The software 136 may be configured to perform the process shown in FIG. 7 and described in greater detail in connection with FIGS. 3-4. In connection with this, the software 136 may access the RF tags database 132 to obtain characteristic and/or calibration information for particular tags, and may also access the RF tag reader information database 134 to obtain information about particular RF tag readers so that it can determine how the power coil information should be interpreted for a particular RF tag and with reference to the particular RF tag reader that registered the RF tag response.

The RF tag processing system may also include multiple RF tag article signature software 138 which, like the software 136, may be incorporated into the RF tag software 130 or may be a stand-alone software program. The software 138 may be configured to perform the process shown in FIG. 8 and described in greater detail in connection with FIGS. 5-6. In connection with this, the software 138 may be configured to receive RF tag signature information associated with an article, or to create a RF tag signature from multiple RF tags associated with a given article, and optionally then to compare the RF tag signature with a previous RF tag signature for the article. RF tag signatures from combinations of RF tags associated with a given article may be stored in an article signatures database 140 to enable different signatures for the same article to be compared at different points in time to detect tampering with the article.

The control logic 126 may implement one or more processes in addition to those shown here, or as an alternative to those shown here, to enable the computer system to implement an RF tag processing system that can generate and/or use three dimensional RF tag signatures. Many other standard components of the computer system have not been illustrated to avoid obfuscation of the more relevant aspects. As is well known in the art, a complete computer system will include many additional components that have not been shown here.

The functions described above may be implemented as a set of software program instructions that are stored in a computer readable memory and executed on one or more processors. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of detecting tampering of a physical article, the method comprising the steps of:
    receiving a first collective response from a first set of tag response signals at a first point in time, the first collective response including a tag response signal from each RF tag of a first set of RF tags associated with the physical article;
    recording the first collective response as a first response signature for the physical article;
    receiving a second collective response from a second set of tag response signals at a second point in time, the second collective response including a tag response signal from each RF tag of the first set of RF tags associated with the physical article;
    comparing the second collective response with the first response signature;
    determining from the step of comparing whether any of the RF tags have been moved spatially relative to the other RF tags on the physical article; and
    interpreting a result of the step of determining as an indication that the physical article has been tampered, when the step of determining indicates:
        that a relative spacing between the RF tags associated with the physical article has changed from the first point in time to the second point in time; or
        that a relative orientation of the RF tags associated with the physical article has changed from the first point in time to the second point in time.

2. The method of claim 1, wherein each RF tag comprises:
    at least two non-coplanar power coils; and
    a circuit connected to the non-coplanar power coils and configured to detect at least one electrical characteristic from at least two of the non-coplanar power coils, and transmit an RF tag code and an indication of the detected electrical characteristics to an RF tag reader.

3. The method of claim 2, wherein the electrical characteristic is at least one of power, current, and voltage.

4. The method of claim 2, wherein the electrical characteristic is the same for each of the at least two non-coplanar power coils.

5. The method of claim 2, wherein the at least two non-coplanar power coils comprise at least three non-coplanar power coils, at least three of which are formed on orthogonal planes.

6. The method of claim 2, wherein power from each of the non-coplanar power coils is used to provide power to the circuit.

7. The method of claim 2, wherein each of the RF tags is a passive RF tag.

8. The method of claim 1, further comprising the step of determining, from a three dimensional RF signature from the first set of RF tags, an orientation of the physical article.

9. The method of claim 1, wherein the first response signature is obtained by directing electromagnetic radiation toward the physical article, and wherein the first response signature depends on the orientation of the RF tags relative to the directed electromagnetic radiation.

10. The method of claim 1, wherein the first response signature is obtained by directing electromagnetic radiation toward the article, and wherein the first response signature depends on the placement of the RF tags on the article.

11. The method of claim 1, wherein the first response signature is obtained by directing electromagnetic radiation toward the article, and wherein the first response signature depends on the path of motion of the article.

* * * * *